Dec. 28, 1965  F. C. BREWSTER ETAL  3,226,581
GENERATING SYSTEM
Filed June 29, 1961  5 Sheets-Sheet 2
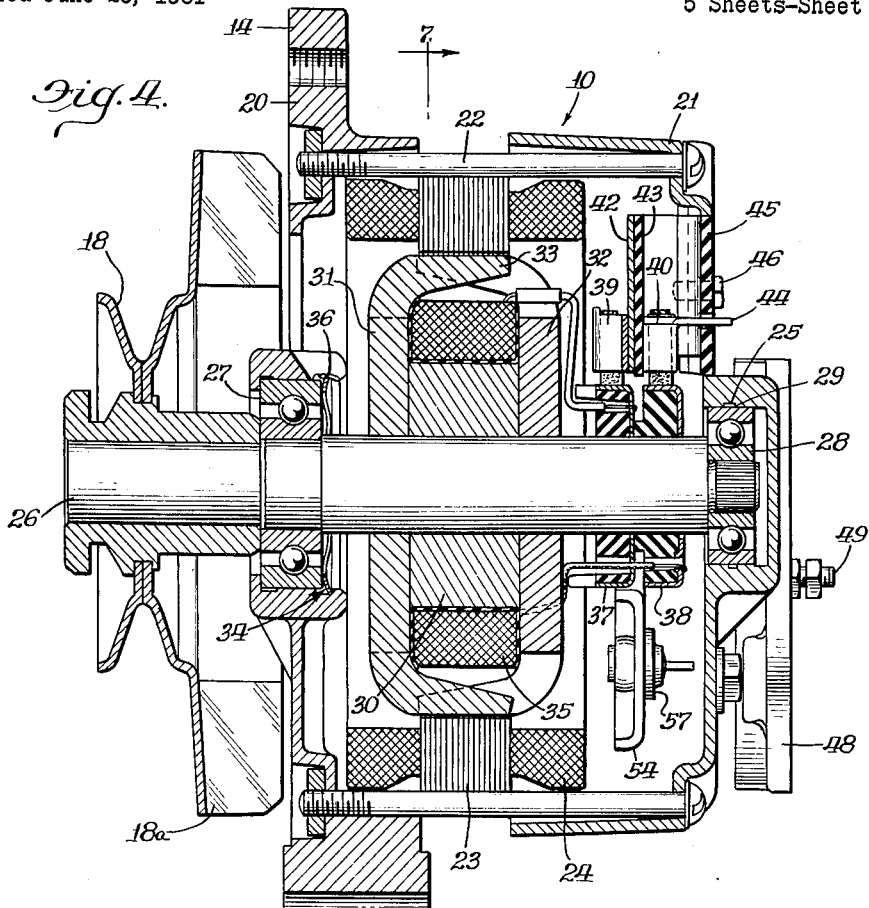
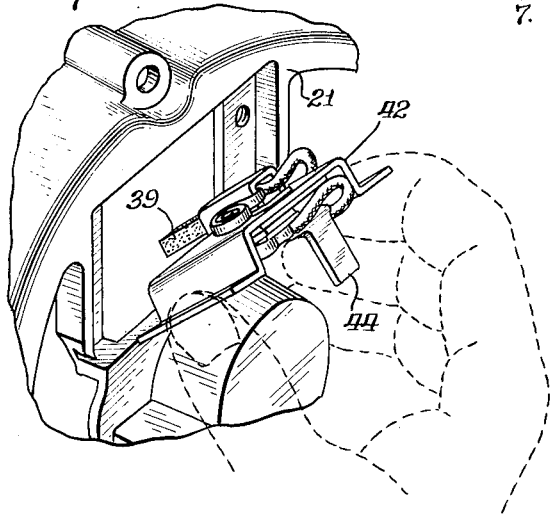
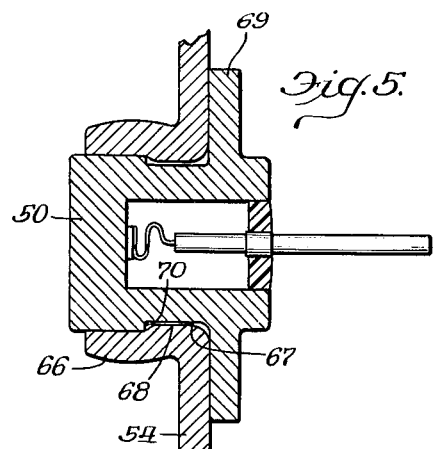
INVENTOR.
Franklin C. Brewster
Charles L. Ithano and
Alfred G. Ocken, Jr.
By Mueller & Aichele
Attys.

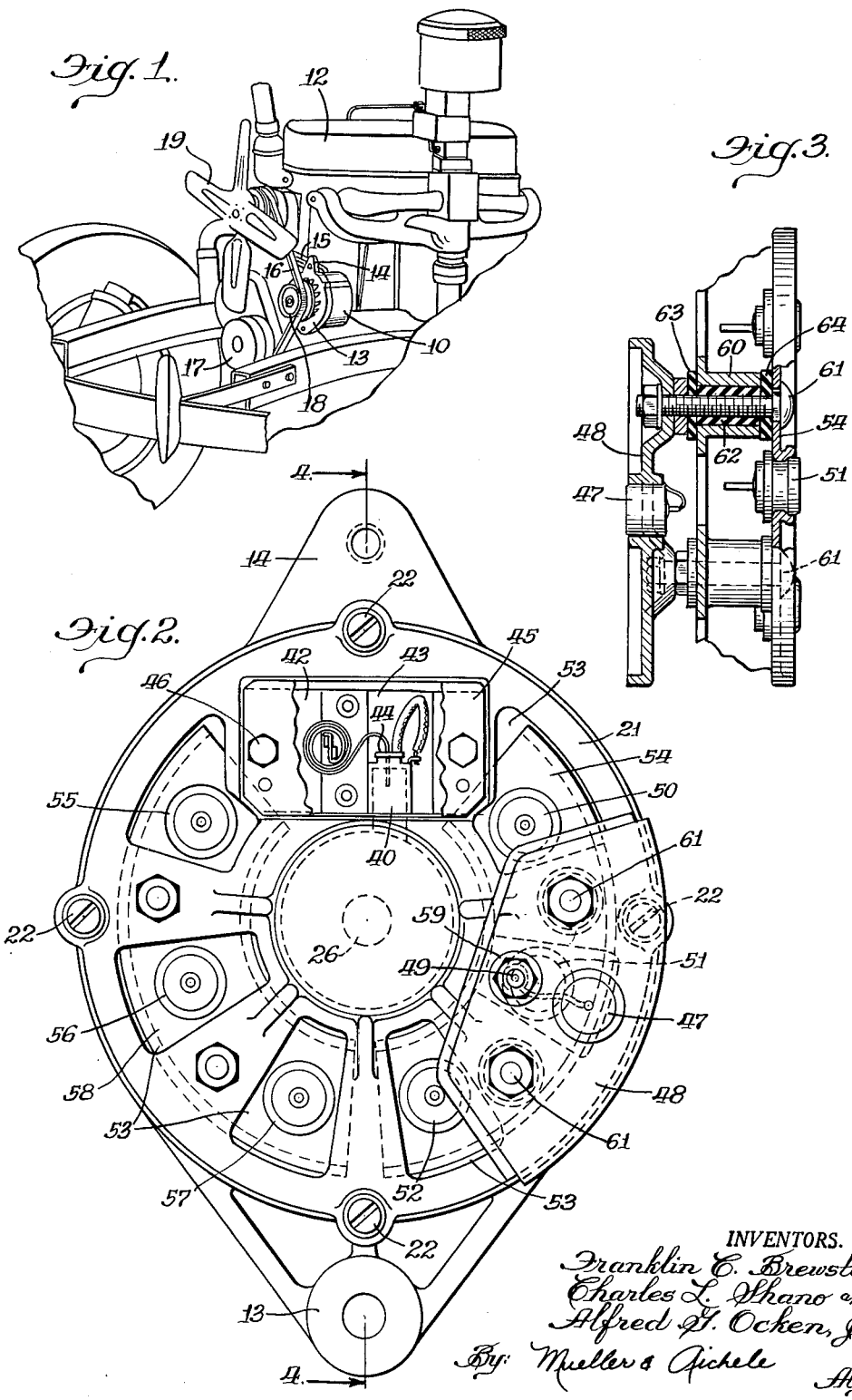

Dec. 28, 1965      F. C. BREWSTER ETAL      3,226,581
GENERATING SYSTEM
Filed June 29, 1961      5 Sheets-Sheet 3
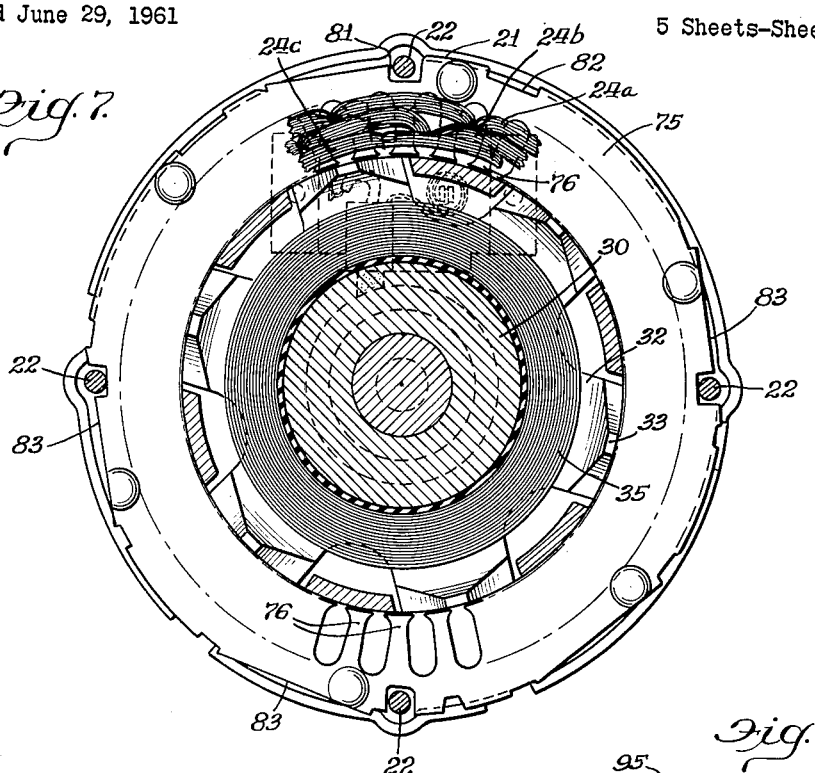
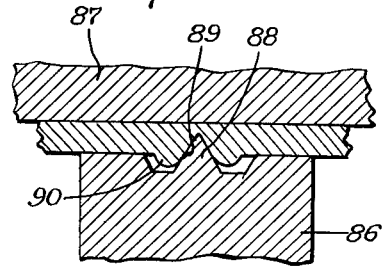
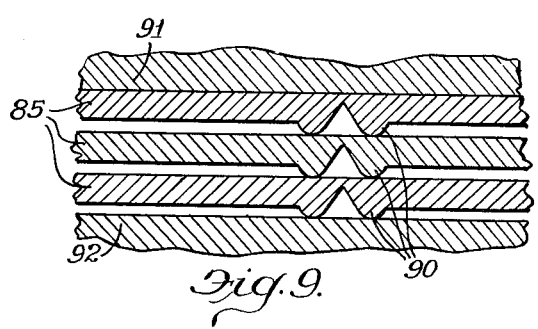
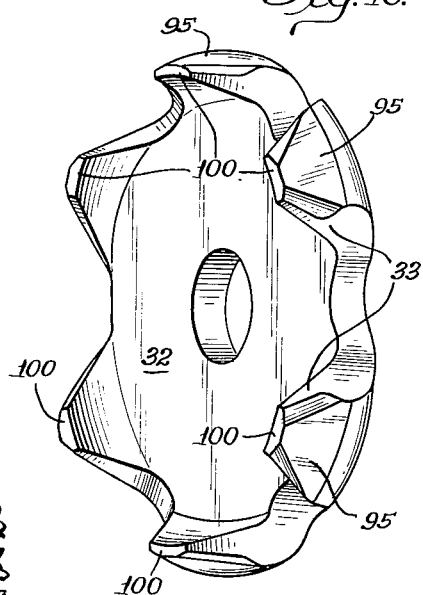
INVENTORS.
Franklin C. Brewster
Charles L. Shano and
Alfred F. Ocken, Jr.
By Mueller & Aichele
Attys.

INVENTORS.
Franklin C. Brewster
Charles L. Shano and
Alfred T. Ocken, Jr.
By: Mueller & Aichele
Attys.

Dec. 28, 1965

F. C. BREWSTER ETAL 3,226,581

GENERATING SYSTEM

Filed June 29, 1961

INVENTORS.
Franklin C. Brewster
Charles L. Shano and
Alfred F. Ocken, Jr.

By Mueller & Aichele
Attys.

United States Patent Office 3,226,581
Patented Dec. 28, 1965

3,226,581
GENERATING SYSTEM
Franklin C. Brewster, Franklin Park, Charles L. Shano, Chicago, and Alfred G. Ocken, Jr., Franklin Park, Ill., assignors to Motorola, Inc., Chicago, Ill., a corporation of Illinois
Filed June 29, 1961, Ser. No. 120,547
20 Claims. (Cl. 310—59)

This invention relates generally to an electrical power generating unit for an automotive vehicle, and more particularly to an alternator and rectifier system for providing electrical current for operating the ignition system and for charging the battery of a vehicle, as well as to furnish power for various accessories of the vehicle.

In the past, direct current generators have been used with automobile engines to supply the electrical power required for operating the engine and for operating the accessories on the automobile. Over the years the power consumed by electrical accessories has increased such that it has been necessary to continually increase the capacity of the generators. This has caused the generators to be of increased size, weight and cost such that there is a need for some better electrical generating unit.

Another problem with direct current generators is that the output power at low speed is very low. Accordingly, during idling of the engine when the automobile is standing still, the generator output may be inadequate to take care of the electrical load over long periods of time. Therefore, when driving in slow traffic during which there may be long waiting periods, and when equipment which draws heavy current is in use, the battery may become discharged to such a point that the electrical system of the engine will not operate properly.

It is therefore an object of the present invention to provide an improved electrical generating system for an automotive vehicle.

A further object of the invention is to provide an improved direct current electrical supply system for a vehicle which includes an alternator and rectifiers all in the form of a compact unit.

Another object of the invention is to provide an alternator rectifier automobile power supply system which is of minimum size and which is extremely rugged to withstand road shock and extreme weather conditions.

Still another object of the invention is to provide an alternator electric current generator for an automotive vehicle which is quiet in operation.

A feature of the invention is the provision of an electric generating unit for an automotive vehicle including a three-phase alternator having rectifiers connected thereto, with rectifiers of opposite polarity being mounted on separate segments, and the two segments being positioned in the same plane as the brushes for applying current to the rotor, so that the entire unit forms a compact structure. A fan at the end of the alternator opposite the rectifiers draws air through openings in the housing of the unit over the rectifiers and the alternator windings for cooling the same.

Another feature of the invention is the provision of an alternator automotive electric generating unit having a laminated stator with a winding thereon in which current is generated and a rotor winding to which current is supplied to provide a rotating field, with the rotor including a magnetic structure about the winding having inturned interleaved pole pieces with curved edges for reducing the noise produced upon rotation thereof.

A further feature of the invention is the provision of an alternator for an automotive electric generator including a laminated stator magnetic structure having an epoxy resin coating thereon to provide insulation in a minimum of space whereby more room is provided for the windings and greater capacity is provided in an alternator of given size. The individual laminations of the stator may have projections formed thereon so that the stack of laminations can be compressed to a predetermined thickness.

A still further feature of the invention is the provision of an alternator-rectifier structure wherein a plurality of rectifier devices are mounted on a heat conducting plate, with the individual rectifiers supported in tubular projections on the plate which forms a secure heat and electrical conducting mounting. For full wave rectification, the rectifiers are mounted on two plates, with one plate being insulated from the alternator frame by annular insulating members about the mounting bolts, which are compressed to provide a moisture tight seal. An additional isolating rectifier may be mounted on a separate plate and supported by the same insulated mounting bolts.

The invention is illustrated in the accompanying drawings wherein:

FIG. 1 shows an automobile engine with the alternator rectifier unit connected thereto;

FIG. 2 is an end view of the generator unit of the invention;

FIG. 3 is a fragmentary view partly in cross section of the rectifier mounting plates;

FIG. 4 is a cross sectional view of the alternator rectifier unit along the lines 4—4 of FIG. 2;

FIG. 5 is a fragmentary cross sectional view of the rectifier mounting;

FIG. 6 shows the brush assembly removed from the housing;

FIG. 7 is a cross sectional view through the rotor and stator of the alternator along lines 7—7 of FIG. 4;

FIGS. 8 and 9 illustrate the forming of the stator laminations;

FIGS. 10 and 11 are detailed illustrations of the configuration of the pole pieces of the rotor;

Figure 16:
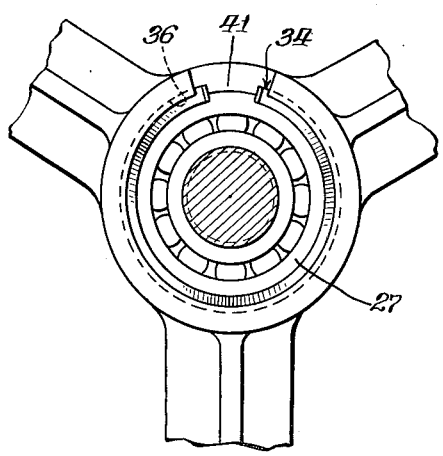
Figure 17:
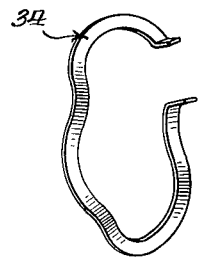

FIGS. 12 to 15 inclusive illustrate the flux path through the rotor and stator;

FIGS. 16 and 17 illustrates the front bearing retaining ring; and

Figure 18:
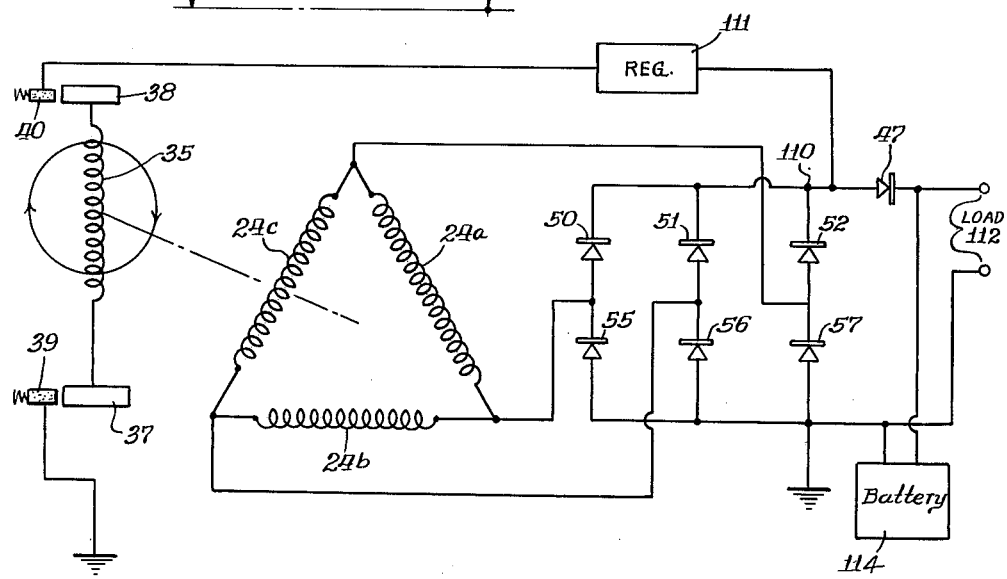

FIG. 18 is a schematic diagram of the alternator rectifier system.

In practicing the invention there is provided an electrical supply unit for an automobile which includes an alternator having rectifiers mounted within the housing thereof for converting the three-phase alternator output into direct current. The alternator is a dynamo electric machine including a stator having a magnetic structure made up of a plurality of laminations, with teeth thereon which the stator windings are positioned. Projections are formed on the sides of the laminations so that the stack of laminations can be compressed to a desired thickness. The laminations are welded together and coated with an epoxy resin so that the three-phase windings thereon are insulated from the magnetic structure. The rotor of the alternator includes two pole plates having interlocking pole pieces which generally surround the rotor winding. The pole pieces of the rotor have curved edges for reducing the noise produced in the stator laminations. Direct current is supplied to the rotor winding through brushes which engage slip rings on the rotor, to provide a rotating field. The rectifiers are mounted on heat conducting plates which are positioned in the same plane as the brushes to utilize this available space, and therefore the size of the alternator is not substantially increased because of the rectifiers. The rectifiers are pressed into tubular portions on the plates, with interlocking sections providing a secure mounting and good heat electrical conductivity despite the different thermal expansion characteristics of the rectifier housings and the mounting plates. One group of rectifiers is mounted on a plate which is grounded to the housing and the other group is insulated by tubular insulating members surrounding the mounting bolts for the mounting plate. The rectified output of the unit is derived from this insulated plate and may be applied through an additional rectifier supported on an insulated plate. A fan is supported on the rotor and draws air through openings in the rear housing over the rectifiers and the mounting plates therefor, and through spaces between the magnetic structure of the stator and the housing, so that air circulates over the stator and rotor windings to cool the same.

Referring now to the drawings, in FIG. 1 there is shown the alternator rectifier unit 10 supported on an automotive engine 12. The unit has a mounting projection 13 connected to a support provided on the engine, and a second projection 14 adjustably secured to a bracket 15 connected to the engine. The alternator is driven by a belt 16 operated by a pulley 17 connected to the crank shaft of the engine. The belt engages pulley 18 on the alternator, a pulley which drives the fan 19, and may also engage pulleys which drive other parts of the engine.

FIGS. 2 and 4 show the general construction of the alternator and rectifier assembly. A front housing section 20 is secured to a back housing section 21 by a plurality of bolts 22. Secured between the housing sections is a laminated magnetic structure 23 of the stator of the alternator. Windings 24 are disposed on the laminated magnetic structure 23. The rotor structure includes a shaft 26 supported from the front frame 20 by ball bearing 27 and supported from the back frame 21 by ball bearing 28 (FIG. 4). The pulley 18, and a fan 18a which may be formed integrally with the pulley, are secured to the shaft 26.

The bearing 28 is held in place by a spring washer 25 provided in a recess 29 in the back frame 21. The front bearing 27 is held in place by a resilient C-ring 34 retained in groove 36 in the front frame 20. The C-ring has a wavy configuration to provide resilient clamping action as is shown in FIG. 17. There is an opening 41 in the edge forming groove 36 for release of the C-ring as shown in FIG. 16. This construction facilitates the assembly of the bearing in the front frame, and makes it possible to remove the shaft and bearing without the use of extensive tools.

A magnetic structure is provided on the rotor including an annular core 30 connected to a front pole plate 31 and a back pole plate 32. Each of the pole plates has six inturned pole pieces or fingers 33 which are interleaved and interspersed with each other. A winding 35 is wound about the core 30 and is generally enclosed by the pole plates and tips. The winding 35 is held in position by the pole plates. The winding has end leads connected individually to slip rings 37 and 38 on the shaft 26. A pair of brushes 39 and 40 are mounted to engage the individual slip rings 37 and 38. The field may be constructed so that the alternator output is self-limiting, as the stator current produces a flux which opposes the rotor flux and which will reach a point to neutralize the rotor flux so that there is no increase in current. The core and pole plates of the rotor are made of low carbon steel which is annealed to be magnetically soft. Therefore, there is little residual magnetism in the rotor field and the regulator action obtained by control of the field current is fully effective even at high speed operation.

The brushes 39 and 40 are supported on a channel shaped bracket 42 connected to the back housing section 21. The brush 39 is conductively connected to the conducting bracket 42 to furnish a ground connection from the housing to one side of the rotor winding. The brush 40 is mounted on insulating plate 43 and is thereby insulated from the housing of the generator. Connection is made to the brush 40 through conducting arm 44 which extends from the brush 40. The arm 44 extends through an opening in insulating cover 45 which is secured to the back housing 21 by screws 46, which support both the insulating cover 45 and the bracket 42. The brushes may be removed from the alternator for replacement or repair by merely removing the screws 46 and withdrawing the bracket 42 with the brushes thereon, as is shown in FIG. 6.

The exciting current for the winding 35 which forms a rotating field is therefore applied between arm 44 and the frame or housing of the alternator which forms a reference or ground point. The winding 24 on the magnetic structure 23 is a three-phase winding as will be described, and provides a three-phase alternating current (A.C.) output in response to rotation of the field of the rotor. For converting the three-phase A.C. output into direct current, rectifiers are mounted within the back housing section 21. Three rectifiers 50, 51 and 52 of one polarity are supported on a heat conducting plate or segment 54. Three rectifiers 55, 56 and 57 of opposite polarity are mounted on a similar heat conducting plate or segment 58 symmetrically positioned with respect to the plate 54. The plate 55 is directly connected to the back cover 21 to effectively ground one electrode of each rectifier mounted thereon, and the other electrodes thereof are connected to the stator winding 24. The plate 54 is insulated from the back cover 21 (FIG. 3) and the rectifiers thereon have one terminal connected to the plate and the other connected to the stator winding 24. The output of the alternator rectifier unit is derived from the plate 54.

The two rectifier mounting plates or segments 54 and 58 are positioned symmetrically with respect to each other and in the same plane as the mounting bracket 42 for the brushes. The rectifiers therefore are positioned in an otherwise unused space so that they do not require an increase in the size of the alternator housing to accommodate the same. The rectifiers may be of the silicon type and the mounting thereof which provides a firm support, and a heat and electrical conducting path to the mounting plates, is shown in detail in FIG. 5.

It will be noted that the back housing section 21 has openings 53 aligned with the various rectifiers. These openings provide passages for air, which is drawn into the unit by action of the fans 18a and passes over the rectifiers and the heat conducting plates on which they are mounted, and through the windings to cool the same. The plates 54 and 58 are positioned quite close to the slip rings 37 so that they direct the air to the outside so that it passes through the stator windings 24. As will be set forth more fully, an epoxy coating is used to insulate the windings and this allows more room for passage of air therein. The openings 53 also facilitate making connections to the rectifiers and making test connections to the stator windings.

The mounting of the heat conducting rectifier supporting plate 54 is shown in FIG. 3. The housing section 21 has tubular bosses 60 formed thereon through which mounting bolts 61 for securing the rectifier mounting plate 54 extend. Tubular insulators 62 are positioned about the bolts, and insulating washers 63 and 64 are provided at the end of the bosses. The bolts 61 are therefore insulated completely from the bosses 60. The insulators 62 may preferably be somewhat longer than the bosses so that they are compressed when the bolts are tightened. This provides effective insulation between plate 54 and the alternator housing when water is thrown into the engine compartment as when driving through slush. The bolts 61 are in electrical contact with the mounting plate 54 so that an electrical connection to the plate can be made by connection to one of the bolts. As previously stated, the rectifiers 50, 51 and 52 have one electrode connected to the plate 54 and the other connected to the three-phase winding 24. The points of connection to the three-phase winding are the same for the rectifiers 50, 51 and 52 as for the rectifiers 55, 56 and 57 (FIG. 18).

A seventh rectifier 47 may be included in the alternator rectifier assembly, and this is provided on a plate 48 fastened to the back housing section by the bolts 61 which support the plate 54 (FIG. 3). One electrode of the rectifier 47, which is connected to the housing thereof, is connected through the bolts 61 to the output of the rectifiers 50–52 which are connected to the three phase windings 24 of the stator. The other electrode of rectifier 47 is connected to terminal 49 which forms the output terminal of the complete unit. The terminal 49 is insulated from the plate 48 by insulator 59 (FIG. 2).

A problem is encountered in the mounting of the rectifiers on the heat conducting plates to provide a firm support and also a good heat and electrical conducting connection. This becomes more difficult because the rectifier housings and the mounting plates may be made of different metals which have different thermal coefficients of expansion. The construction in accordance with the invention is shown in FIG. 5, with the mounting of rectifier 50 in the heat conducting plate 54 being illustrated. The rectifier is forced into a tubular projection 66 formed in the plate 54. The rectifier has an undercut section 67 and the base of the tubular portion 66 is crimped so that a part 68 thereof is forced into the undercut section. This provides a locking engagement so that the rectifier is held tight on the heat conducting plate in the presence of heavy vibration or shock. The crimping of the tubular projections of the plate 54 provides a wedging action between the rim 69 of the rectifier and the shoulder 70 of the undercut portion thereof. This produces reliable heat and electrical conduction from the rectifier housing to the mounting plate under all conditions of expansion and contraction.

The configuration of the laminations of the stator and the windings thereon are shown in FIG. 7. This figure also shows the rotor structure. The laminations 75 include teeth 76 on which three windings 24a, 24b and 24c are provided. These windings produce the output current of the alternator, which is a three-phase alternating current with one phase being developed by each of the windings. The three windings may be connected in delta as shown in FIG. 18. The laminations 75 have recesses 81 to accept the assembly bolts 22, and additional recesses 82 and flat edges 83 which result in spaces between the laminations and the housing sections 20 and 21. These spaces permit air to be drawn therethrough by the fan 18a so that air circulates around the windings to cool them.

In the construction of the laminations for the magnetic structure of the stator, it is desired to use an inexpensive lamination stock and this may have substantial variations in thickness. In the event that a plurality of laminations all of the minimum thickness within the tolerance range are used together, the thickness of the total stack may be substantially less than when a plurality of laminations all of the maximum thickness within the tolerance range are used together. This results in an objectionable variation in the size of the assembled unit. As is apparent from FIG. 4, the spacing of the housing sections 20 and 21 is determined by the thickness of the stack of laminations, which is 0.7 inch in the unit illustrated. As these housings support the bearings for the rotor and the brushes which engage slip rings on the rotor, it is necessary that they be accurately positioned with respect to each other when the unit is assembled.

In order to provide a stack of laminations for the stator which has a prescribed thickness, the laminations may be constructed as shown in FIGS. 8 and 9. FIG. 8 shows a lamination 85 which has been deformed by action of a die 86 which operates against the base or platen 87. The point 88 on the die produces a recess 89 in the lamination 85, and the material forced out of the recess forms a projection 90 about the recess. FIG. 9 shows a plurality of laminations 85 positioned adjacent each other and the projections 90 on the laminations hold the adjacent lamination spaced therefrom. The projections must be shaped so that a recess is not formed on the side of one lamination into which the projection of the adjacent lamination may fall. A stack of laminations formed as shown in FIG. 8 may be placed in a press having jaws 91 and 92 which engage the sides of the stack and cause them to be compressed to a prescribed thickness. The laminations are then welded together to form a single magnetic structure. By this construction, the stacks of laminations may be reduced to a uniform thickness so that production alternators will have a fixed configuration.

As previously stated, a coating of epoxy resin may be provided on the laminated stator magnetic structure to insulate the windings 24 therefrom. This may be deposited on the structure in a known manner. The epoxy coating takes less space than paper or other insulating layers so that more space is provided for windings in a structure of a given size. This increases the capacity of the unit. The use of epoxy insulation also results in a structure having openings between the windings and the magnetic structure for the circulation of air, to thereby provide effective cooling and further increase the capacity.

FIG. 7 also shows an end view of the pole pieces 33 of the pole plate 32, and a cross section view through the base of the pole pieces 33 of the pole plate 31. The pole pieces are assembled and ground down so that the outside surfaces 95 are cylindrical (FIG. 10). The outside diameter of the rotor of the alternator illustrated is 3.49 inches.

Figure 11:
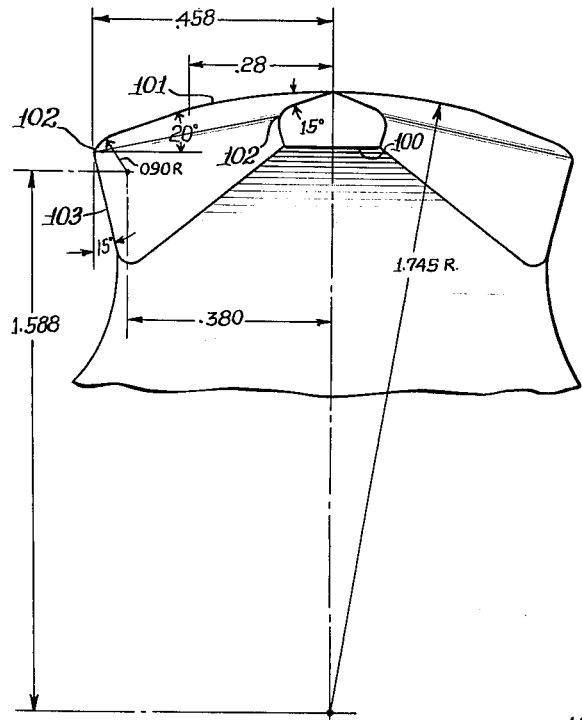

FIG. 11 shows the detailed construction of the pole pieces of the rotor. The individual pole pieces are tapered to a small end or tip 100, the top edges of which are slanted at an angle of 15° with respect to the tangent to the outer surface of the rotor. The base 101 of the pole piece follows the circular outer diameter of the rotor to a point 0.28 inch from the center line. At this point the configuration changes to a straight line having an angle of 20° with respect to the tangent at the center line of the pole piece. The 15° taper at the tip gradually blends into the 20° taper at the base. The corner 102 is rounded with a radius of 0.09 inch all the way from the tip to the base. The base is cut back along the sides 103 at an angle of 15°.

Figure 12:
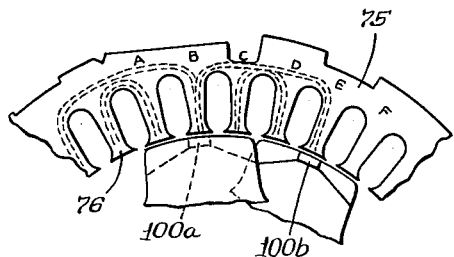
Figure 13:
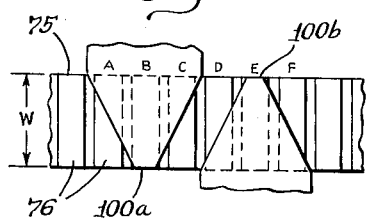

The shaping of the pole pieces has been found to be a major factor in the control of the noise produced by the alternator. The stator is small and light and the laminations, although welded around the outside edge, are free to vibrate at the teeth provided to receive the windings. The forces producing such vibration will be apparent from a consideration of FIGS. 12, 13, 14 and 15. In FIGS. 12 and 13, the rotor is shown aligned with the stator so that the tips 100 of the pole pieces are directly under teeth in the stator magnetic structure. More specifically, the pole tip 100a is directly under the tooth B, and the pole tip 100b is directly under the tooth E. Since the pole pieces extend under these stator teeth through the entire width thereof, the reluctance between the pole tips and the teeth B and E will be a minimum so that the maximum flux will flow through these teeth. The flux through the laminations which make up the width of these teeth will have the same magnetic polarity and will therefore repel each other, tending to force the laminations apart.

Figure 14:
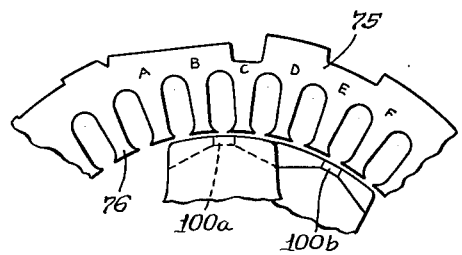
Figure 15:
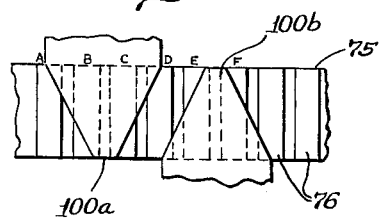

The stator teeth C and D in the positions shown in FIGS. 12 and 13 have pole pieces under only a part of the widths thereof so that there is substantially flux through only the laminations at the ends of these teeth. The flux in the two teeth is of opposite polarity and is through opposite ends of the teeth, and this tends to draw the laminations together. When the rotor moves so that the pole tips 100 are aligned with the spaces between the stator teeth, the edges of the adjacent pole pieces lie under the same pole tip. This is illustrated in FIGS. 14 and 15 where pole pieces 100a and 100b both coincide with a small part of tooth D. In this position there is substantial flux through the laminations of the tooth D, which is of opposite polarity in the two ends of the tooth causing the laminations to be strongly attracted to each other. It is therefore seen that as the rotor moves the laminations of each tooth are alternately repelled from each other and then attracted, and this produces the vibration of the laminations which causes objectionable noise.

By rounding the edges of the pole teeth as shown in FIG. 11 and described in connection therewith, the reluctance of the path between the rotor pole pieces and the stator teeth increases substantially from the point where all the flux through any tooth is in one direction to the point where the flux through opposite edges of the tooth is in opposite directions. Considering FIGS. 12 and 13, the flux through the stator teeth B and E will not be substantially changed by the rounding of the edges of the pole pieces 100a and 100b. However, the stator teeth C and D are aligned with only the edges of the rotor pole pieces and by rounding these edges this flux will be greatly reduced. At the position shown in FIGS. 14 and 15, the reluctance of the path between the pole pieces and the tooth D will be greatly increased by rounding of the edges of the pole pieces, so that the flux is greatly reduced. The particular shaping thereof has reduced the attraction between the laminations which result in a marked decrease in the vibration thereof, and in the noise produced when the rotor is operating.

FIG. 18 is a schematic diagram showing the alternator rectifier system as used in an automobile electrical system. The field winding 35 is on the rotor and is connected to the slip rings 37 and 38 to which contact is made by brushes 39 and 40. The brush 39 is grounded as has been described. The rotor windings 24a, 24b and 24c are connected in delta, with the junctions of the windings being connected to three rectifier branches, each including two rectifiers connected in series. The rectifiers are connected between ground and the output terminal 110 which is provided by the mounting plate 54 of the rectifiers 50, 51 and 52. The field winding on the rotor may be energized from the output of the rectifiers through a regulator circuit 111. This may be a transistor regulator circuit for controlling the current supplied to the field winding 35 to supply the desired output voltage at the terminal 110.

Although the alternator has been described as a three phase machine having the stator windings connected in delta, it is obvious that the stator windings can be connected in a Y arrangement. Also the structure can be used to produce any number of phases by relating the pole pieces on the rotor and the stator teeth in the required way as is known in the art.

The direct current output at terminal 110 is applied to battery 114 and to output or load terminals 112. The rectifier output at terminal 110 will supply the load when the generator is operating, and under other conditions this load is supplied from the battery 114. The generator, of course, also charges the battery 114 when it has become discharged by supplying current to the load. The rectifier 47 isolates the battery 114 from the output terminal 110. Although the rectifiers 50, 51 and 52 prevent the battery from discharging through the alternator windings 24a, 24b and 24c, the battery would supply current through the regulator 111 to the field winding 35 when the unit is not operating, in the absence of the rectifier 47. The rectifier 47 may also serve other purposes in the system.

The alternator and rectifier unit described provide a compact assembly which supplies adequate direct current for use in the electrical system of an automobile. The construction described can be produced at reasonable cost and has advantages not present in direct current generators. In particular, the generating capacity at low speed is much superior to that of a direct current generator. By constructing the rotor as described, the alternator does not produce objectionable noise. The arrangement of the parts with passages for the circulation of air over the rectifiers and through the windings results in effective cooling, so that large capacity is provided in a unit of small size.

We claim:

1. A direct current power supply unit for an automotive vehicle including in combination, a dynamo electric machine having a supporting frame, stator means and rotor means supported by said frame, said stator means including a laminated magnetic structure and winding means thereon, said rotor means including a magnetic structure having interleaved pole pieces and winding means thereon, means for applying direct current to said rotor winding means to provide a rotating magnetic field whereby alternating current is induced in said stator winding means, an output terminal, rectifier means connected between said stator winding means and said output terminal, said frame including heat conducting means for supporting said rectifier means, said pole pieces of said magnetic structure of said rotor means being tapered from base portions to tip portions and having faces adjacent said stator magnetic structure which are slanted away from said stator structure adjacent the edges to reduce the noise produced by said machine.

2. A direct current power supply unit in accordance with claim 1 wherein said rectifier means includes a plurality of rectifier devices connected in a full wave rectifier circuit for converting the alternating current developed in said stator winding means to a direct current, and at least one rectifier device connected between said rectifier circuit and said output terminal.

3. A direct current power supply unit for an automotive vehicle including in combination, a dynamo electric machine having a supporting frame, a stator means and rotor means supported by said frame, said stator means including a laminated magnetic structure and three phase winding means thereon, said rotor means including a magnetic structure having interleaved pole pieces and winding means thereon, means applying direct current to said rotor winding means to provide a rotating magnetic field whereby alternating current is induced in said three phase stator winding means, an output terminal, first, second and third pairs of rectifiers connected with the same polarity between said output terminal and a reference potential, the intermediate connections between the rectifiers of said pairs being connected to said stator winding means so that each pair rectifies the current of one phase developed in said stator winding means, said frame including heat conducting means for supporting said rectifiers, said pole pieces of said magnetic structure of said rotor means having surfaces facing said magnetic structure of said stator means and which are slanted away from such magnetic structure adjacent the edges of the pole pieces to reduce the vibrations of said laminated magnetic structure and noise produced thereby.

4. A direct current power supply unit for an automotive vehicle including in combination, a dynamo electric machine having a supporting frame, stator means and rotor means supported by said frame, said stator means including a magnetic structure formed of a plurality of annular laminations with teeth formed on the inner edge thereof, winding means about said teeth of said magnetic structure, said rotor means including a magnetic structure having a pair of pole plates and winding means therebetween, said plates having pole pieces extending from each plate toward the other which are interleaved with each other and which are tapered from the base thereof to a pole tip, said pole pieces having faces closely spaced to said stator teeth which faces slant away from said stator teeth adjacent the edges of said pole pieces, means for applying direct current to said rotor winding means to provide a rotating magnetic field whereby alternating current is induced in said stator winding means, an output terminal, and rectifier means connected between said stator winding means and said output terminal, said frame including heat conducting means for supporting said rectifier means.

5. An alternator including in combination, a supporting frame having stator means thereon, rotor means supported by said frame, said stator means including a magnetic structure formed of a plurality of annular laminations with teeth formed on the inner edge thereof, winding means about said teeth of said magnetic structure, said rotor means including a magnetic structure having a pair of pole plates and winding means therebetween, said plates having pole pieces extending from each plate toward the other which are interleaved with each other and which are tapered from the base thereof to a pole tip, said pole pieces having faces closely spaced to said stator teeth which faces slant away from said stator teeth adjacent the edges of said pole pieces, and means applying direct current to said rotor winding means to provide a rotating magnetic field whereby alternating current is induced in said stator winding means.

6. An alternator in accordance with claim 5 wherein said frame includes first and second housing sections on opposite sides of said magnetic structure of said stator, and said first housing section includes mounting projections extending therefrom and forming the sole mounting means for the alternator.

7. A dynamo-electric machine including in combination, first and second housing sections, stator means and rotor means connected to said housing sections, said stator means including a magnetic structure and winding means thereon, means securing said housing sections on opposite sides of said magnetic structure, said rotor means including a shaft pivotally mounted on said housing sections with a magnetic structure having winding means thereon, said magnetic structure of said rotor means including a pair of pole plates on opposite sides of said winding means with interleaved pole pieces extending from each pole plate toward the other, each of said pole pieces being tapered from the base thereof to a tip and having a face adjacent said magnetic structure of said stator means with curved edges extending from said base to said tip, said rotor means including a pair of slip rings connected to said winding means thereof, said slip rings being supported on said rotor means intermediate said magnetic structure thereof and the pivotable mounting thereof on said first housing section and a removable brush assembly supported on said first housing section and having a pair of brushes engaging said slip rings for making connections to said rotor winding means, said first housing section having an aperture for receiving a portion of said brush assembly so that said brushes are positioned within said first housing section in engagement with said slip rings, said first housing section having an opening therein, and fan means connected to said rotor means and rotating therewith for drawing air through said opening in said first housing section with the air passing over said winding means to cool the same.

8. A dynamo-electric machine including in combination, first and second housing sections, stator means and rotor means connected to said housing sections, said stator means including a magnetic structure and winding means thereon, means securing said housing sections on opposite sides of said magnetic structure, said rotor means including a shaft with a magnetic structure thereon having winding means therewith, said first and second housing sections each including pivotal mounting means for said shaft, said rotor means including a pair of slip rings between said rotor means and said first housing section connected to said winding means thereof, a removable brush assembly supported on said first housing section and having a pair of brushes mounted on a supporting bracket, said first housing section having an aperture therein, said bracket being removably secured to said first housing section with a part of said brush assembly extending through said aperture and said brushes extending within said first housing section and engaging said slip rings for making electrical connections to said rotor winding means, said brush assembly being removable from outside the machine without removing said first housing section therefrom, said first housing section having an opening therein, and fan means connected to said rotor means and rotating therewith for drawing air through said opening in said first housing section with the air passing over said winding means to cool the same.

9. A direct current power supply unit for an automotive vehicle including in combination, a dynamo electric machine having first and second housing sections, stator means and rotor means connected to said housing sections, said stator means including a magnetic structure formed of a plurality of laminations and winding means thereon, means securing said housing sections on opposite sides of said magnetic structure, said magnetic structure having a configuration such that open spaces are provided between said magnetic structure and said housing sections, said rotor means including a shaft pivotally mounted on said housing sections with a magnetic structure having winding means thereon, said magnetic structure of said rotor means including a pair of pole plates on opposite sides of said winding means with interleaved pole pieces extending from each pole plate toward the other, each of pole pieces being tapered from the base thereof to a tip and having a face adjacent said magnetic structure of said stator means with slanted edges extending from said base to said tip, said rotor means including at least one slip ring connected to said winding means thereof, a removable brush assembly supported on said first housing section, said first housing section having an aperture therein, said brush assembly having a portion extending through said aperture and having a brush engaging said slip ring for applying current to said rotor winding means, said brush assembly being removable from the outside of the machine with said first and second housing sections remaining in assembled relation, an output terminal, rectifier means connecting said stator winding means to said output terminal, thermal and electrical conducting means supporting said rectifier means and positioned in the same plane as said brush means, said first housing section having an opening adjacent said rectifier means, and fan means connected to said rotor means and rotating therewith for drawing air through said opening in said first housing section and through said open spaces between said stator magnetic structure and said housing sections, with the air passing over said rectifier means and said winding means to cool the same.

10. A direct current power supply unit for an automotive vehicle including in combination, a dynamo electric machine having first and second housing sections, stator means and rotor means connected to said housing sections, said stator means including a magnetic structure having an epoxy resin coating thereon, three-phase winding means on said magnetic structure, means clamping said housing sections on opposite sides of said magnetic structure, with the clamped parts having open spaces therebetween, said rotor means including a shaft pivotally mounted on said housing sections with a magnetic structure thereon having interleaved pole pieces and winding means, said rotor means including a pair of slip rings rotating with said shaft, brush means supported on said first housing section and engaging said slip rings for applying direct current to said rotor winding means, an output terminal, a first group of three rectifiers having housings connected to electrodes thereof of one polarity and terminals connected to electrodes of the opposite polarity, a second group of three rectifiers having housings connected to the electrodes thereof of the opposite polarity and having terminals connected to the electrodes of one polarity, first and second heat and electrical conducting segments for supporting said rectifiers of said first and second group respectively, said first and second segments being secured to said first housing section and positioned in the same plane as said brush means, said first housing section having openings adjacent said rectifiers, said first heat conducting segment being electrically connected to said first housing section and connecting said housing of said rectifiers of said first group thereto, said second heat conducting segment being insulated from said first housing section and electrically connected to said output terminal, means connecting said terminals of said rectifiers of said first and second groups to said stator winding means for rectifying the three phase current developed therein, said terminals of said rectifiers being accessible through said openings in said first housing section, and fan means connected to said rotor means and rotating therewith for drawing air through said openings in said first housing section over said rectifiers and through said spaces between said housing sections and said stator magnetic structure, said first and second segments deflecting the air passing thereover toward said stator winding means to cool the same.

11. A direct current power supply unit for an automotive vehicle including in combination, an alternator having first and second housing sections, stator means and rotor means connected to said housing sections, said stator means including a magnetic structure having an epoxy resin coating thereon, winding means on said magnetic structure, means clamping said housing sections on opposite sides of said magnetic structure, with the clamped parts having open spaces therebetween, said rotor means including a shaft pivotally mounted on said housing sections with a magnetic structure thereon having interleaved pole pieces and winding means, said rotor means including a pair of slip rings rotating with said shaft, brush means including a mounting bracket removably supported on said first housing section and brush members resiliently engaging said slip rings for applying current to said rotor winding means, said brush means being removable from said first housing section of the alternator with said housing sections and rotor means in assembled relation, an output terminal, a plurality of rectifiers having terminals, first and second heat and electrical conducting segments for supporting said rectifiers secured to said first housing section and positioned in the same plane as said brush means, said first heat conducting segment being electrically connected to said first housing section and connecting said rectifiers thereon thereto, said second heat conducting segment being insulated from said first housing section and electrically connected to said output terminal, means connecting said terminals of said rectifiers to said stator winding means for rectifying the current developed therein, said first housing section having openings adjacent said rectifiers, and fan means connected to said rotor means and rotating therewith for drawing air through said openings in said first housing section over said rectifiers and through said spaces between said housing sections and said stator magnetic structure, said first and second segments deflecting the air passing thereover toward said stator winding means to cool the same.

12. A direct current power supply unit for an automotive vehicle including in combination, an alternator having first and second housing sections, stator means and rotor means connected to said housing sections, said stator means including a laminated magnetic structure having an epoxy resin coating thereon, winding means on said magnetic structure, means clamping said housing sections on opposite sides of said magnetic structure, with the clamped parts having open spaces therebetween, said rotor means including a shaft with a magnetic structure thereon having interleaved pole pieces and winding means, bearing means on said housing sections for supporting said shaft, said pole pieces being tapered and having curved edges, said rotor means including a pair of slip rings rotating with said shaft, brush means including a mounting bracket removably supported on said first housing section and brush members resiliently engaging said slip rings for applying current to said rotor winding means, said brush means being removable from said first housing section of the alternator with said housing sections and rotor means in assembled relation, a plurality of rectifiers having conducting housings and terminals connected to the electrodes thereof, first, second and third heat and electrical conducting segments for supporting said rectifiers, said first and second segments being positioned in the same plane as said brush means, means for securing said first heat conducting segment to said first housing and for electrically connecting the same and said rectifiers thereon thereto, said first housing section having apertures therein, supporting means for said second and third heat conducting segments extending through said apertures and including conducting means for interconnecting the same and tubular insulating members for insulating said conducting means from said first housing section, said supporting means compressing said insulating members to seal said apertures, said rectifiers on said second and third segments being electrically interconnected through said conducting means, means connecting said terminals of said rectifiers on said first and second segments to said stator winding means for rectifying the current developed therein, output terminal means connected to said terminal of a rectifier on said third segment, said first housing section having openings adjacent said rectifiers, and fan means connected to said rotor means and rotating therewith for drawing air through said openings in said first housing section over said rectifiers and through said spaces between said housing sections and said stator magnetic structure, said first and second segments deflecting the air passing thereover toward said stator winding means to cool the same.

13. A direct current power supply unit for an automotive vehicle including in combination, an alternator having housing means, stator means and rotor means connected to said housing means, said stator means including a magnetic structure having winding means thereon, said rotor means including a shaft pivotally mounted on said housing means with a magnetic structure thereon having pole pieces and winding means, means for applying current to said rotor winding means, a plurality of rectifiers having conducting housings and terminals connected to the electrodes thereof, first, second and third heat and electrical conducting segments for supporting said rectifiers secured to said housing means, said first and second segments being positioned in the same plane as said brush means, said first heat conducting segment being electrically connected to said housing means and connecting said rectifiers thereon thereto, means for supporting said second and third heat conducting segments from said housing means including tubular insulating members for insulating said supporting means from said housing means, said rectifiers on said second and third segments being electrically interconnected through said supporting means, means connecting said terminals of said rectifiers on said first and second segments to said stator winding means for rectifying the current developed therein, and output terminal means connected to said terminal of a rectifier on said third segment.

14. A direct current power supply unit for an automotive vehicle including in combination, a dynamo electric machine having first and second housing sections, stator means and rotor means connected to said housing sections, said stator means including a magnetic structure formed of a plurality of laminations and winding means thereon, means securing said housing sections on opposite sides of said magnetic structure, said rotor means including a shaft with a magnetic structure having winding means thereon, first and second bearings for supporting said shaft, resilient spring means supported on said first housing section and releasably engaging said first bearing, said second housing having a cylindrical portion for receiving said second bearing, said cylindrical portion having a shoulder at one end and a groove in the other end, resilient C-ring means engaging said groove and holding said second bearing in said cylindrical portion against said shoulder, means for applying current to said rotor winding means, an output terminal, rectifier means connecting said stator winding means to said output terminal, thermal and electrical conducting means supporting said rectifier means and positioned in the same plane as said current applying means, said first housing section having an opening adjacent said rectifier means, and fan means connected to said rotor means and rotating therewith for drawing air though said opening in said first housing section with the air passing over said rectifier means and said winding means to cool the same.

15. A direct current power supply unit for an automotive vehicle including in combination, a dynamo electric machine having first and second housing sections, stator means and rotor means connected to said housing sections, said stator means including a magnetic structure formed of a plurality of laminations and winding means thereon, means securing said housing sections on opposite sides of said magnetic structure, said rotor means including a shaft with a magnetic structure having winding means thereon, first and second bearings for supporting said shaft, said first housing section including means for releasably engaging said first bearing, said second housing having a cylindrical portion for receiving said second bearing, said cylindrical portion having a shoulder at one end and a groove in the other end, a C-ring formed of resilient material and having transversely curved portions engaging said groove and holding said second bearing in said cylindrical portion against said shoulder, means for applying current to said rotor winding means, an output terminal, rectifier means connecting said stator winding means to said output terminal, thermal and electrical conducting means supporting said rectifier means and positioned in the same plane as said current applying means, said first housing section having an opening adjacent said rectifier means, and fan means connected to said rotor means and rotating therewith for drawing air through said opening in said first housing section with the air passing over said rectifier means and said winding means to cool the same.

16. A direct current power supply unit for an automotive vehicle including in combination, an alternator having a supporting frame, stator means and rotor means supported by said frame, said stator means including a magnetic structure and three phase winding means thereon, said rotor means including a magnetic structure having pole pieces and winding means thereon, brush means for applying direct current to said rotor winding means to provide a rotating magnetic field whereby alternating current is induced in said three phase stator winding means, an output terminal, a first group of three rectifiers connected with the same polarity between said output terminal and said stator winding means, a second group of three rectifiers connected with the same polarity between said stator winding means and a reference potential, the three rectifiers of each group rectifying respectively the currents of three phases developed in said stator winding means, a first heat conducting segment for supporting said rectifiers of said first group, a second heat conducting segment for supporting said rectifiers of said second group, said first and second segments being secured to said frame and positioned in the same plane as said brush means, and fan means connected to said rotor means and rotating therewith for drawing air over said rectifiers and said winding means to cool the same.

17. A direct current power supply unit for an automotive vehicle including a combination, an alternator having a supporting frame, stator means and rotor means supported by said frame, said stator means including a magnetic structure and three phase winding means thereon, said rotor means including a magnetic structure having pole pieces and winding means thereon, brush means for applying direct current to said rotor winding means to provide a rotating magnetic field whereby alternating current is induced in said three phase stator winding means, an output terminal, a first group of three rectifiers connected with the same polarity between said output terminal and said stator winding means, a second group of three rectifiers connected with the same polarity between said stator winding means and a reference potential, the three rectifiers of each group rectifying respectively the currents of three phases developed in said stator winding means, a first heat conducting segment for supporting said rectifiers of said first group, supporting members for mounting said first segment on said frame, said frame having openings for receiving said supporting members, tubular insulating members made of compressible material about said supporting means, said supporting members axially compressing said insulating members whereby said insulating members fill said openings, a second heat conducting segment for supporting said rectifiers of said second group, means for grounding said second segment to said frame, said first and second segments being positioned in the same plane as said brush means and spaced therefrom.

18. A direct current power supply unit for an automotive vehicle including in combination, an alternator having a supporting frame, stator means and rotor means supported by said frame, said stator means including a magnetic structure and winding means thereon, said rotor means including a magnetic structure having pole pieces and winding means thereon, brush means for applying direct current to said rotor winding means to provide a rotating magnetic field whereby alternating current is induced in said stator winding means, an output terminal, at least one rectifier having a terminal connected to said stator winding means for rectifying the current developed in said stator winding means, and a heat conducting segment supporting said rectifier, said rectifier having a cylindrical conducting housing having an annular rim and an annular recess adjacent said rim, said segment having an integral tubular portion for receiving said rectifier housing, said rim of said rectifier housing engaging said segment and said tubular portion having a part extending in said recess to provide an interlocking fit whereby secure mechanical and electrical engagement is maintained in the presence of thermal expansion and contraction of said housing and said segment.

19. A direct current power supply unit for an automotive vehicle including in combination, an alternator having first and second housing sections, stator means and rotor means connected to said housing sections, said stator means including a magnetic structure and winding means thereon, said rotor means including a shaft pivotally mounted on said housing sections with a magnetic structure and winding means thereon, said rotor means including a pair of slip rings rotating with said shaft, brush means including a mounting bracket removably supported on said first housing section and brush members within said first housing section resiliently engaging said slip rings for applying current to said rotor winding means, said brush members being removable from within said first housing section of the alternator by removing said bracket with said housing sections, stator means and rotor means in assembled relation, a plurality of rectifiers having terminals, first and second heat and electrical conducting segments for supporting said rectifiers secured to said first housing section and positioned in the same plane as said brush means, means connecting said terminals of said rectifiers to said stator winding means for rectifying the current developed therein, said first housing section having openings adjacent said rectifiers providing access to said rectifier terminals, and fan means connected to said rotor means and rotating therewith for drawing air through said openings in said first housing section and over said rectifiers.

20. A direct current power supply unit for an automotive vehicle including in combination, an alternator having first and second housing sections, stator means and rotor means connected to said housing sections, said stator means including a magnetic structure and winding means thereon, said rotor means including a shaft pivotally mounted on said housing sections with a magnetic structure and winding means thereon, said rotor means including a pair of slip rings rotating with said shaft, brush means including a mounting bracket removably supported on said first housing section and brush members within said first housing section resiliently engaging said slip rings for applying current to said rotor winding means, said brush members being removable from within said first housing section of the alternator by removing said bracket with said housing sections, stator means and rotor means in assembled relation, a plurality of rectifiers each having a pair of terminals, first and second heat and electrical conducting segments for supporting said rectifiers and making electrical connection to one terminal thereof, means connecting said other terminals of said rectifiers to said stator winding means for rectifying the current developed therein, said conducting segments being secured to said first housing section and positioned in the same plane as said brush means, said first housing section having openings adjacent said rectifiers providing access to said rectifier terminals, rectifier means connected to one of said conducting segments for passing the output current therefrom, and fan means connected to said rotor means and rotating therewith for drawing air through said openings in said first housing section and over said rectifiers and said rectifier means.

References Cited by the Examiner
UNITED STATES PATENTS

| | | | |
|---|---|---|---|
| 828,247 | 8/1906 | Riggs | 310—65 |
| 831,625 | 9/1906 | McElroy | 310—65 X |
| 1,816,859 | 8/1931 | Linders | 310—217 X |
| 1,923,864 | 8/1933 | Graham | 310—239 |
| 2,393,065 | 1/1946 | Rose | 310—217 X |
| 2,588,175 | 3/1952 | Stewart | 310—263 X |
| 2,779,883 | 1/1957 | Schumann | 310—90 |
| 3,001,121 | 9/1961 | Kerr | 310—72 |
| 3,030,528 | 4/1962 | De Jean | 310—45 |
| 3,041,484 | 6/1962 | Freer | 310—68 |
| 3,078,409 | 2/1963 | Bertsche | 310—68.4 |

FOREIGN PATENTS 1,160,476  3/1958  France.

ORIS L. RADER, *Primary Examiner.*

DAVID X. SLINEY, *Examiner.*